United States Patent [19]
Tuusa et al.

[11] Patent Number: 5,140,514
[45] Date of Patent: Aug. 18, 1992

[54] REGULATION OF D.C. VOLTAGE OF A PULSE-WIDTH MODULATED RECTIFIER USING SPATIAL VECTORS IN A STATIONARY COODINATE SYSTEM

[75] Inventors: Heikki Tuusa, Tampere; Jaakko Ollila, Pirkkala, both of Finland

[73] Assignee: Kone Elevator GmbH, Switzerland

[21] Appl. No.: 695,057

[22] Filed: May 3, 1991

[30] Foreign Application Priority Data

May 3, 1990 [FI] Finland .................. 902226

[51] Int. Cl.$^5$ .......................... H02M 7/797
[52] U.S. Cl. ..................... 363/81; 363/126; 363/127
[58] Field of Search ........... 363/37, 80, 81, 89, 363/126, 127, 41; 388/811; 318/806

[56] References Cited

U.S. PATENT DOCUMENTS 4,933,828  6/1990  Ogawa et al. ............... 363/81
4,984,147  1/1991  Araki ........................... 363/84
5,034,874  7/1991  Araki ........................... 363/41

FOREIGN PATENT DOCUMENTS 363003  12/1973  Sweden .

*Primary Examiner*—William H. Beha, Jr.
*Attorney, Agent, or Firm*—Sughrue, Mion, Zinn, Macpeak & Seas

[57] ABSTRACT

Procedure for regulating the d.c. voltage of a pulse-width modulated rectifier bridge controlled by self-commutated semiconductor components and provided with filtering coils, in which procedure the phase voltages of the supplying three-phase mains and the d.c. voltage of the rectifier are measured. The modulation references needed for the pulse-width modulation are produced using pure sine and cosine curves synchronized with the mains voltages, with spatial vectors formed from them or with components of such vectors, by means of a phase-locked loop. The regulation is effected in a coordinate system tied to the spatial vector of the mains voltages.

11 Claims, 4 Drawing Sheets

REGULATION OF D.C. VOLTAGE OF A PULSE-WIDTH MODULATED RECTIFIER USING SPATIAL VECTORS IN A STATIONARY COODINATE SYSTEM

BACKGROUND OF THE INVENTION

1. Field of the Invention

The present invention relates to a procedure for regulating the d.c. voltage of a pulse-width modulated rectifier bridge controlled by self-commutated semiconductor components.

Pulse-width modulated mains rectifier bridges are used to feed a constant-voltage load, which is connected to the d.c. terminals of the rectifier. Such a load may be e.g. an inverter provided with a constant-voltage intermediate circuit, used to feed an elevator motor. The characteristic features of such rectifiers include two-way power flow and, due to pulse-width modulation (PWM), low distortion levels for the currents in the supplying network.

2. Description of Related Prior Art

Previously known procedures are based on the use of phase voltages measured via transformer circuits to produce either the current references for a rectifier working on the principle of two-position control, or the voltage references for a PWM rectifier. In both cases, the disturbances materialized in the phase voltages are directly transmitted to the modulation references and therefore to the currents taken from the network. This involves a deterioration of the characteristics of the rectifiers, especially in industrial networks where as it is well known, the voltages are distorted. Moreover, when a two-position control is used the rectifier voltages and currents contain harmonics which extend over a large frequency range and are therefore difficult to filter. In addition, for both methods, each phase voltage requires its own regulation circuits, thus increasing the complexity of the systems.

SUMMARY OF THE INVENTION

In the method of the invention, the modulation references are produced using pure sine and cosine curves synchronized with the mains voltages, spatial vectors formed from them or with components of such vectors by means of a phase-locked loop. This ensures that mains voltage distortions will have no effect, via the modulation references, on the mains currents. On the other hand, the regulation is effected in a coordinate system tied to the spatial vector of the mains voltages, allowing regulation of the d.c. components. Thus, it is not necessary to provide separate regulation arrangements for each phase as in previously known procedures. Among the advantages are also a reduced number of regulation components required, a faster regulation (shorter response times) and a lower level of mains current distortion.

BRIEF DESCRIPTION OF THE DRAWINGS

In the following, the invention is described in greater detail by the aid of examples with reference to the attached drawings, in which.

DESCRIPTION OF THE PREFERRED EMBODIMENTS

Figure 1:
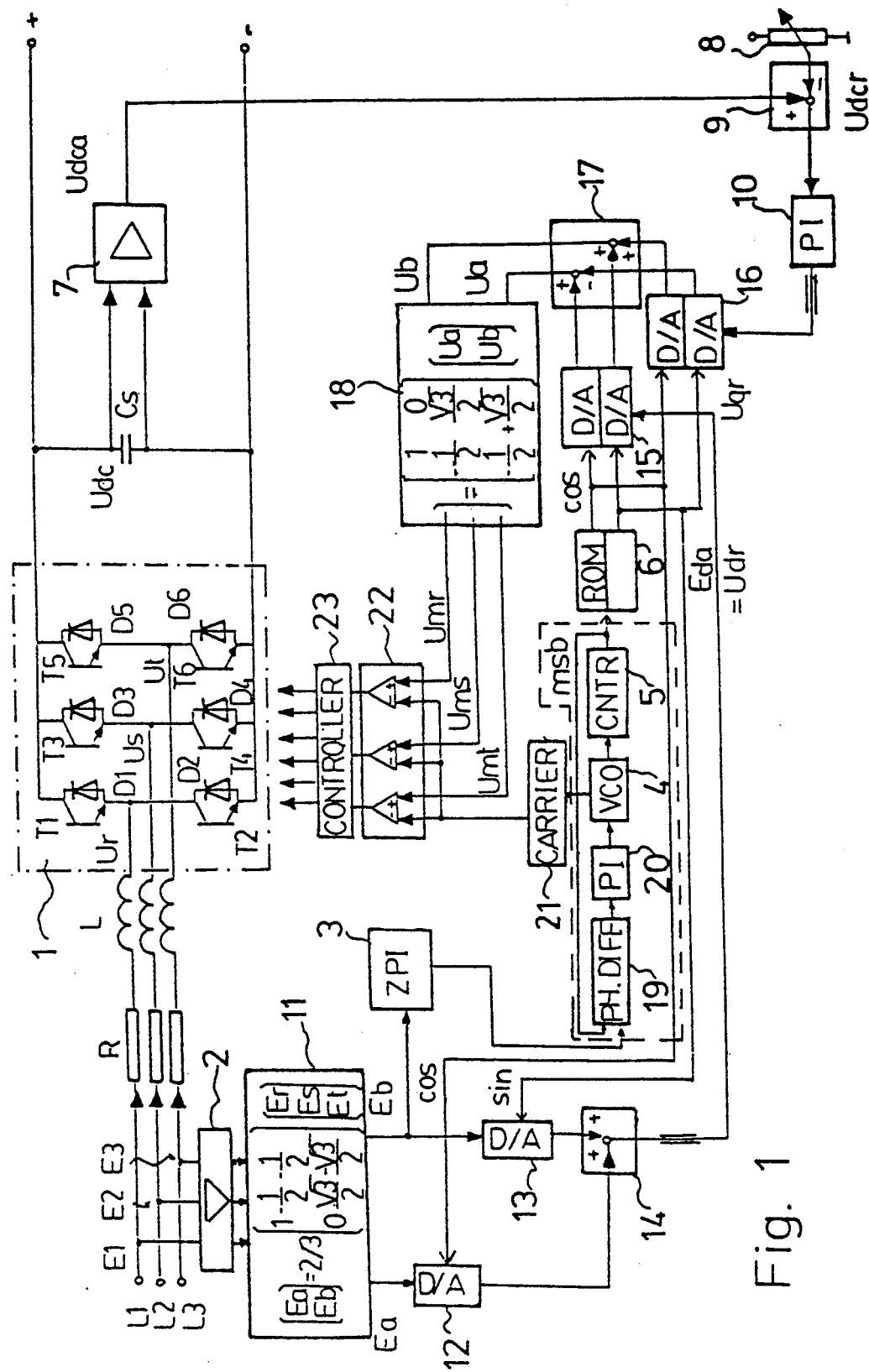
FIG. 1 illustrates a mains rectifier and a basic control system used for its regulation as provided by the invention.

The mains rectifier shown in FIG. 1 is connected to a three-phase mains network L1-L3 and comprises a pulse-width modulated (PWM) rectifier bridge 1 consisting of self-commuting power components, such as transistors T1-T6, diodes D1-D6 connected in inverse-parallel with them, and the filtering components L and Cs connected to the mains and d.c. sides respectively.

The measured voltages Er, Es and Et of the phases L1-L3 of the supplying network are attenuated in an amplifier unit 2 to a level suited for the regulation electronics. The attenuated voltage signals are passed to a unit 11 where the real and imaginary components Ea and Eb of the spatial vector are calculated in a stationary coordinate system. The calculation is effected using generally known conversion formulas, shown in the block representing unit 11 (e.g. Bühler: Einführung in die Theorie geregelter Drehstromantriebe, Band 1, S. 49–50), and the summing operational amplifier circuits 14. The imaginary component Eb is passed to a zero-point indicator 3 which outputs an inverted square wave synchronized with the voltage in question. This wave is applied to a first input of the phase comparator 19, of a phase-locked loop PLL1 consisting of a phase comparator 19, PI-controller 20, voltage-controlled oscillator (VCO) 4 and a counter 5. The output of the phase comparator is applied to the input of the PI-controller 20, whose output determines the output frequency of the voltage-controlled oscillator (VCO) 4. The output of the oscillator (VCO) 4 is passed further to the counter 5, whose output is used as the address of a ROM unit 6. The ROM unit contains either one or two ROM circuits holding a pure sine or cosine curve. In the first alternative, the sine and cosine values are read in succession, and in the latter (two ROMs) alternative, in parallel. With the most-significant bit (msb) of the counter being applied to the second input of the phase comparator 19, the sine and cosine curves can be synchronized with the zero point of the imaginary component Eb of the spatial voltage vector, when the spatial vector is on the real axis of the calculation coordinates. Thus, the sine and cosine values obtained from the ROM unit 6 are also the sine and cosine values of the phase angle of the spatial voltage vector in the stationary coordinate system.

The real part or d-component Ed of the spatial voltage vector in the coordinates tied to said vector is calculated from the real and imaginary components Ea and Eb of the vector using a generally known conversion equation:

$$Ed = Ea \cos \Phi + Eb \sin \Phi \quad (1)$$

This equation is implemented using two multiplying D/A converters 12 and 13 and a summing operational amplifier 14. The procedure is simple and fast and it reduces the total response time, i.e. the time required for a change in the mains voltage to produce an effect on the control of the rectifier bridge 1. In circuit 12, the real component Ea of the spatial vector obtained from block 11, is multiplied by the cosine of the new coordinate angle obtained from the ROM unit 6, and, similarly, in circuit 13 the imaginary component Eb is multiplied by the sine of the coordinate angle. The summer 14 performs the addition required by the conversion equation (1). As the new reference coordinates are oriented in the same direction a the voltage vector, the voltage vector has no imaginary part (Eq=0) in this coordinate system, and its real part is equal to the absolute value of the indicators of the phase voltages Er, Es and Et, i.e. the top value of the phase voltages. This is a way to produce momentary information on the magnitude of the phase voltages of a three-phase system.

As will be shown later in connection with FIGS. 3a and 3b, the effective power absorbed by the rectifier can be directly influenced by the imaginary part or q-component of the spatial vector of the rectifier voltages Ur, Us and Ut when a coordinate system tied to the mains voltage vector is used for reference. In the same way, the reactive power is influenced by the real part or d-component of the spatial vector. When it is equal to the d-component of the mains voltage vector, a system containing only an ideal mains filter coil L has a power factor of one.

The d.c. voltage to be regulated is measured by an attenuating differential amplifier 7, and the measured voltage Udca thus obtained is compared in a differential circuit 9 to a voltage Udcr obtained from a setpoint unit 8. The difference is fed into a controller 10 with a limited output providing the q-component Uqr of the spatial vector of the rectified voltages. This component together with the d-component Udr, which is equal to the d-component Eda of the mains voltages, unambiguously determines the direction and magnitude of the spatial vector describing the rectifier voltages.

After this, the spatial vector corresponding to the desired rectifier voltages is converted back to stationary coordinates by means of multiplying D/A converter units 15 and 16 and a summing unit 17, which implement the well-known inverted conversion equations:

$$Ua = Ud \cos \Phi - Uq \sin \Phi \qquad (2)$$

$$Ub = Ud \sin \Phi - Uq \cos \Phi \qquad (3)$$

The real and imaginary spatial vector components thus obtained are further converted in block 18 into three-phase modulation references Umr, Ums and Umt. The conversion is effected using summing operational amplifier circuits implementing the commonly known conversion equations presented in block 18.

The modulation references Umr, Ums and Umt are compared by a comparator unit 22 to a triangular wave obtained from a carrier generator 21, the triangular wave being synchronized with the voltage-controlled oscillator (VCO) 4 in the phase-locked loop. This ensures that the modulation pulse references obtained from the comparator unit 22 contain no subharmonic components. The modulation pulse references obtained from the comparator unit 22 are passed via a base current amplifier unit 23 to the power components of the mains rectifier, which produce the desired rectifier voltages Ur, Us and Ut.

Figure 2:
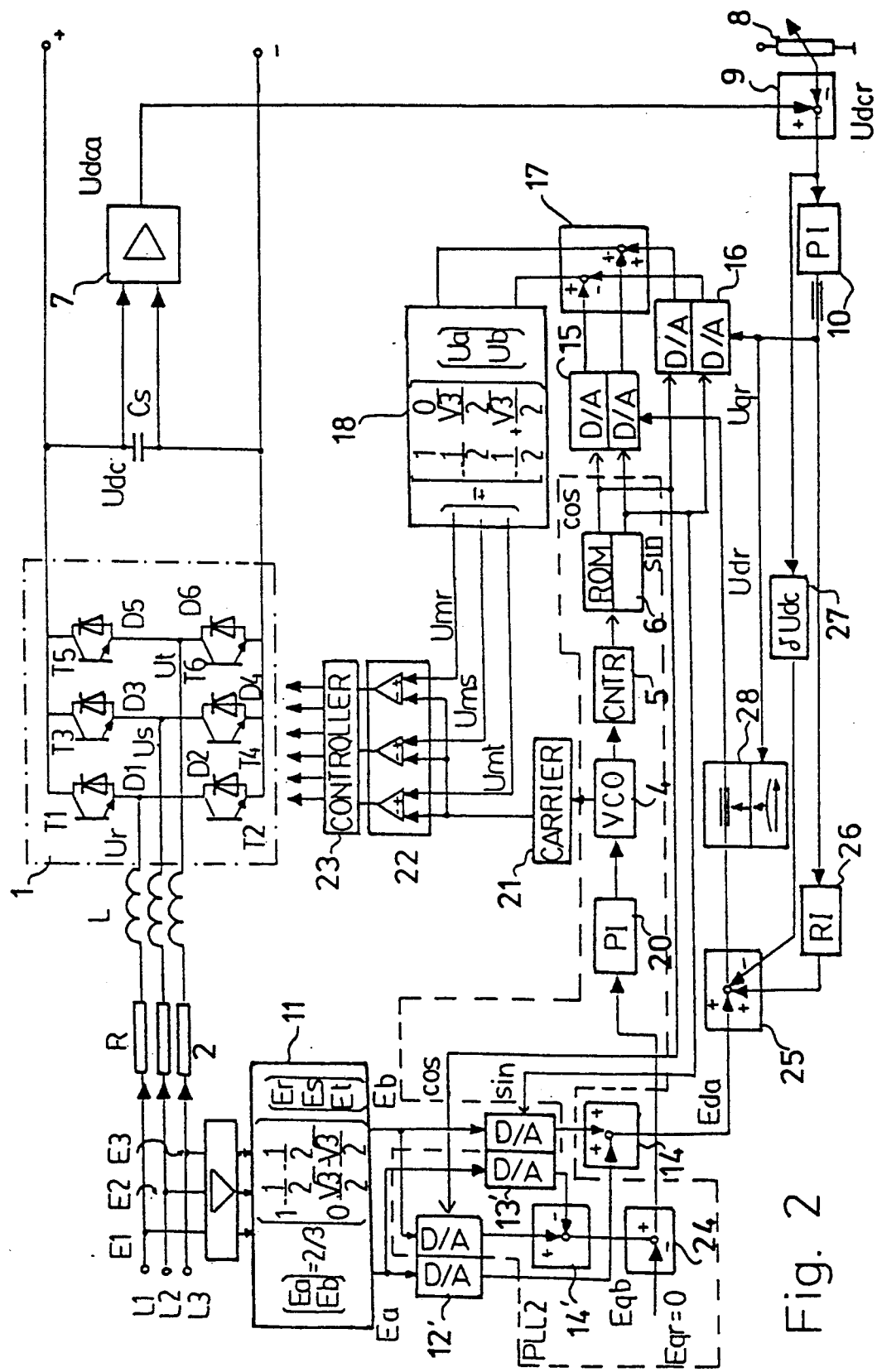
FIG. 2 illustrates a mains rectifier and another control system used for its regulation as provided by the invention.

FIG. 2 illustrates another embodiment of the control system of the invention. It differs from the system in FIG. 1 as follows:

a) The frequency of the phase-locked loop PLL2 is controlled by means of the q-component of the spatial voltage vector. It is calculated, like the d-component, using the other D/A converter in the converter units 12' and 13' and the summer 14', which implement the well-known conversion equation:

$$Eq = -Ea \sin \Phi - Eb \cos \Phi \qquad (4)$$

For the calculation coordinate system to be oriented in the same direction as the spatial voltage vector, the q-component of the spatial voltage vector calculated in it must be zero. Thus, the calculated q-component Eqa is compared to a zero setpoint Eqr in a differential unit 24. If the differential quantity obtained from this unit is positive, the PI-controller 20 will increase the frequency of the voltage-controlled oscillator 4, and vice versa. In this way, the calculation coordinates are adjusted to orient them in the same direction with the spatial voltage vector E. In the procedure, the angle between the spatial vector and the calculation coordinates is compared continuously, whereas in the case of the phase-locked loop of FIG. 1, this was only done at the zero point of the voltage Eb.

b) A feed-forward voltage depending on the differential quantity obtained from the d.c. voltage and setpoint voltage Udcr, has been added to the formation of the d-component Udr of the rectifier voltage. If the d.c. voltage is not equal to the setpoint Udcr, the voltages Ur, Us and Ut obtained from the rectifier bridge 1 will not correspond to the modulation references Umr, Ums and Umt. Therefore, the summer 25 adds to the d-component Eda a signal proportional to the voltage difference. This signal is obtained with a scaling circuit 27 and it compensates the error caused by the voltage difference in the d-component, which is significant with regard to the reactive power. The voltage controller 10 effects the correction of the q-component Uqr.

c) The effect the resistances R of the filter coils L have on the formation of reactive power is eliminated using an additional reference signal of the d-component Udr, which is proportional to the q-component Uqr. To this end, the summer 25 adds to the d-component Eda a signal proportional to the q-component Uqr, obtained from a scaling circuit 26. Details for this correcting signal are given in connection with FIGS. 4c and 4d.

d) The maximum value of the reference value Udr of the rectifier voltages depends on the magnitude of the q-component Uqr. As the absolute value of q-component Uqr increases, the allowed maximum value Udrm of d-component Udr must be reduced to ensure that the allowed maximum values of the modulation references, i.e.

$$Umrh = Umsh = Umth = \sqrt{Udrm^2 + Uqr^2} \qquad (5)$$

formed from them, will never exceed the maximum values of the triangular wave used for their modulation, and also to ensure that the whole permitted range of variation of d-component Udr is continuously in use. This limiting circuit consists of block 28, which is implemented using known operational amplifier circuits.

In the limiter, the dependence of the maximum value of d-component Udrm, of q-component Uqr has been linearized for simplification.

Figure 3A:
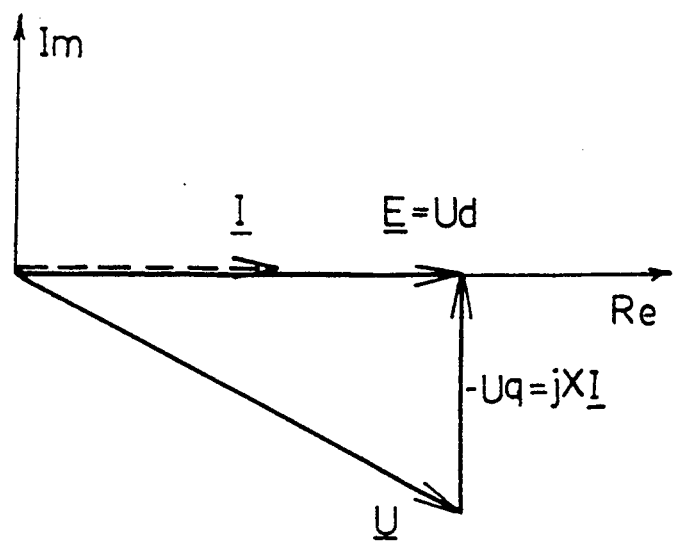
FIGS. 3a and 3b show voltages and current vectors, clarifying the method used for the regulation of the voltage, assuming that the filter coils are ideal.
Figure 3B:
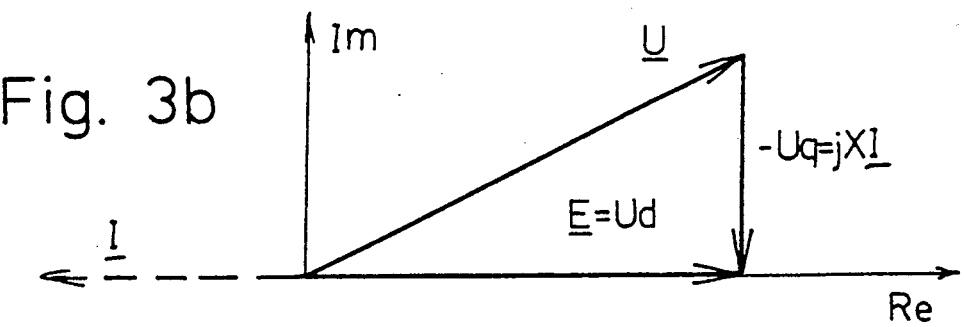

FIGS. 3a and 3b show the current and voltage vectors I and U, which are used to clarify the principle of regulation of the effective and reactive powers of the system. The known general equations for effective and reactive power are:

$$P = 3/2 \, Re \, \{EI^*\} = 3/2 \, (E_d I_d + E_q I_q) \quad (6)$$

$$Q = 3/2 \, Im \, \{EI^*\} = 3/2 \, (+E_d I_q - E_q I_d) \quad (7)$$

If the regulation takes place in a coordinate system oriented in the same direction as the voltage vector, the latter term in the component-form equations disappears ($E_q = 0$). When the magnitude of the mains voltage vector $E = E_d$ is constant, the effective power P can be regulated by the d-component $I_d$ of the current and the reactive power Q, by the q-component $I_q$. In the regulation system of the invention, the reactive power is kept at zero, i.e. the current vector I is adjusted until it takes the same direction with the voltage vector E. This means, both in the case of FIG. 3a, in which power flows from the supplying network to the load, and in the case of FIG. 3b, in which power flows from the load to the supplying network, that the vector jXI of the voltage across the filter inductance L is perpendicular to the mains voltage vector E. This condition is satisfied when the d-component Ud of the vector U of the rectifier voltage is equal to the vector of the mains voltage. On the other hand, in this case, in a stationary condition, the q-component Uq of U determines the magnitude of the current vector I ($=I_d$), and it can be used directly to adjust the effective power of the system.

Figure 4A:
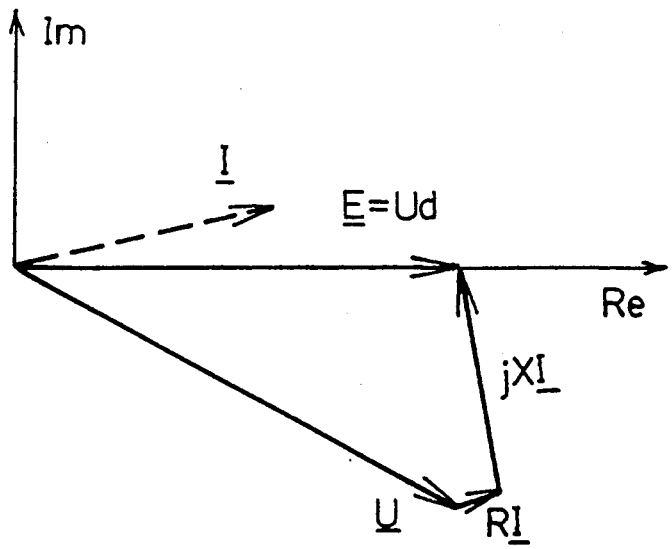
FIGS. 4a and 4b show the current and voltage vectors obtained when the resistances of the filter coils are taken into consideration.
Figure 4B:
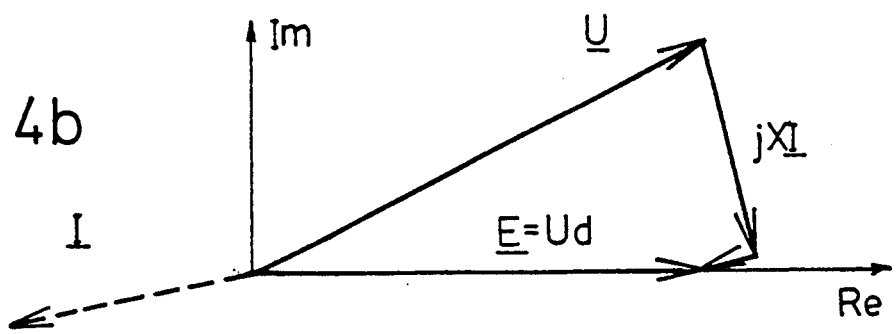
Figure 4C:
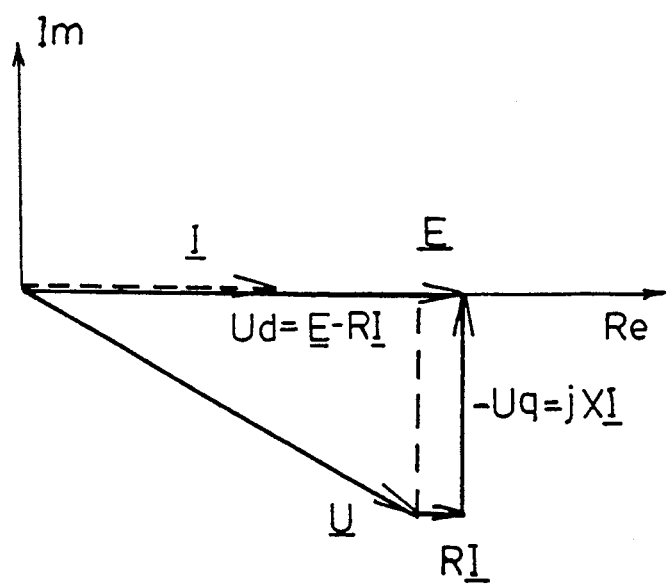
FIGS. 4c and 4d illustrate the current and voltage vectors for the embodiment of FIG. 2.
Figure 4D:
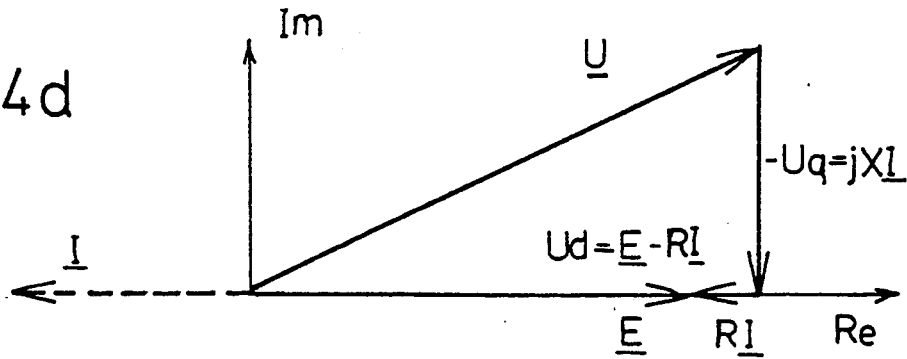

FIGS. 4a–4d show the current and voltage vectors in different cases when the resistances of the filtering coils L are taken into consideration. As can be seen from FIGS. 4a and 4b, corresponding to FIGS. 3a and 3b, the vector RI of the voltage across the resistances changes the situation in such a way that the current vector I no longer runs in the same direction as the voltage vector E although the d-component Ud=E. To nullify the reactive power of the system in this case, the magnitude of the d-component Ud must be changed by an amount equal to the vector RI, as shown by FIGS. 4c and 4d. FIG. 4c represents a situation where power is flowing from the mains to the load, and FIG. 4d a situation where power is flowing from the load to the mains. Since the current vector I in these cases is determined directly from the magnitude of the q-component Uq, the d-component Ud must be altered proportional to the q-component Uq. The coefficient proportion is determined by the inductance L, resistance R and the angular frequency of the mains. In the control system illustrated by FIG. 2, this correction is performed by means of the summer 25 and block 26.

It is obvious to a person skilled in the art that different embodiments of the invention are not restricted to the examples described above, but that they may instead be varied within the scope of the following claims.

We claim:

1. A method for regulating the d.c. voltage of a pulse-width modulated rectifier bridge controlled by self-commuting semiconductor components and provided with filtering coils, comprising the steps of:

(a) measuring the phase voltages of the supplying three-phase mains and the d.c. voltage of the rectifier;
   (b) determining a spatial vector of the mains voltages, spatial vectors formed from them and components of such vectors;
   (c) selecting a coordinate system tied to the spatial vector of the mains voltages; and
   (d) producing modulation references for the pulse-width modulation using pure sine and cosine curves, synchronized with the mains voltages, with spatial vectors formed from them or with components of such vectors, by means of at least one phase locked loop.

2. A method as claimed in claim 1, comprising: synchronizing said sine and cosine curves by comparing a phase angle between said spatial vector of the mains voltages and calculated coordinates at the zero point of an imaginary component of said spatial vector of the mains voltages, or continuously by adjusting the imaginary component of the spatial vector to zero in the coordinate system.

3. A method as claimed in claim 2 comprising:
   calculating said imaginary component of the spatial vector from the phase voltages in a stationary coordinate system;
   producing from said imaginary component a rectangular wave synchronized with its zero point and controlling a phase-locked loop with said wave; and
   producing in said phase-locked loop the addresses of at least one memory circuit holding said sine and cosine curves.

4. A method as claimed in claim 2 wherein the imaginary component of said spatial vector of the mains voltage is adjusted to zero by the steps of:
   calculating the actual value of said imaginary component, multiplying the real and the imaginary components of said stationary coordinate system by the cosine and sine values of the coordinate angle obtained from said phase-locked loop in accordance with known conversion equations;
   comparing said actual value to a zero setpoint;
   applying the differential quantity thus obtained to a controller whose output controls a voltage-controlled oscillator;
   counting the pulses of said oscillator by means of a counter whose output is used as the address of a memory unit holding the pure sine and cosine curves; and
   using the sine and cosine values corresponding to the address of said memory unit for the calculation of the actual value of said imaginary component.

5. A method as claimed in claim 1, wherein said modulation references are produced by the steps of:
   calculating in said coordinate system, from the real and imaginary components of the spatial voltage vector, a real part of said spatial voltage vector corresponding to the absolute value of the phase voltage indicators, said real part being the same as a real component of the spatial vector of the rectifier voltages;
   comparing the d.c. voltage of the rectifier to a setpoint voltage, applying the difference quantity obtained to a controller and obtaining from the controller the imaginary component of the spatial vector of the rectifier voltages;

determining the direction and magnitude of the spatial vector describing the rectifier voltages from said real and imaginary components;

converting the spatial vector corresponding to the desired rectifier voltage to a stationary coordinate system; and further converting the real and imaginary components of the spatial vector thus obtained into three-phase modulation reference signals.

6. A method as claimed in claim 5, wherein the real component of said spatial vector of the rectifier voltages is obtained using feed-forward depending on the differential quantity between the measured value of d.c. voltage of the rectifier bridge and said setpoint voltage.

7. A method as claimed in claim 1, wherein the effect of the internal resistance of the filtering coils connected to the mains voltages is compensated by means of an additional reference voltage proportional to the imaginary component of said spatial vector of the rectified voltage.

8. A method as claimed in claim 5, wherein the allowed maximum value of the real component of said spatial vector of the rectifier voltages is decreased as the absolute value of the imaginary component increases.

9. A method as claimed in claim 5, wherein the multiplication of the real and imaginary components of said stationary coordinate system by the cosine and sine values of the angle obtained from the phase-locked loop is performed by means of at least one D/A converter.

10. A method as claimed in claim 5, wherein the calculation of the real part of said spatial voltage vector, which real part is the same as the real component of the spatial vector of the rectifier voltages, is performed by means of at least one multiplying D/A converter.

11. A method as claimed in claim 5, wherein the conversion of said desired rectifier voltages to a stationary coordinate system is performed by means of at least one D/A converter.

* * * * *